(12) United States Patent
Marupaduga

(10) Patent No.: US 11,690,115 B1
(45) Date of Patent: Jun. 27, 2023

(54) DUAL-CONNECTIVITY ANCHOR-CARRIER SELECTION BASED ON TRANSMISSION-MODE SUPPORT

(71) Applicant: Sprint Spectrum L.P., Overland Park, KS (US)

(72) Inventor: Sreekar Marupaduga, Overland Park, KS (US)

(73) Assignee: Sprint Spectrum LLC, Bellevue, WA (US)

( * ) Notice: Subject to any disclaimer, the term of this patent is extended or adjusted under 35 U.S.C. 154(b) by 88 days.

(21) Appl. No.: 16/948,513

(22) Filed: Sep. 22, 2020

(51) Int. Cl.
*H04W 76/15* (2018.01)
*H04W 72/0453* (2023.01)
*H04W 76/27* (2018.01)
*H04W 92/10* (2009.01)
*H04W 84/18* (2009.01)

(52) U.S. Cl.
CPC ....... *H04W 76/15* (2018.02); *H04W 72/0453* (2013.01); *H04W 76/27* (2018.02); *H04W 84/18* (2013.01); *H04W 92/10* (2013.01)

(58) Field of Classification Search
CPC ..... H04W 76/15; H04W 76/27; H04W 76/16; H04W 76/20; H04W 76/23; H04W 76/25; H04W 72/0453; H04W 72/046; H04W 72/08; H04W 72/085; H04W 36/0069; H04W 36/0055; H04W 36/14; H04W 36/08; H04W 36/16; H04W 36/165; H04W 36/18; H04W 36/28; H04W 36/30; H04W 84/18; H04W 84/20; H04W 92/10
See application file for complete search history.

(56) References Cited

U.S. PATENT DOCUMENTS

| | | | |
|---|---|---|---|
| 6,393,003 B1 * | 5/2002 | Lee | H04W 36/18 455/442 |
| 10,623,070 B1 | 4/2020 | Marupaduga et al. | |
| 10,716,158 B1 | 7/2020 | Pawar et al. | |
| 2006/0154671 A1 * | 7/2006 | Kang | H04W 72/21 455/450 |
| 2011/0070880 A1 * | 3/2011 | Song | H04W 36/08 455/423 |

(Continued)

OTHER PUBLICATIONS

U.S. Appl. No. 16/450,217, filed Jun. 24, 2019.

*Primary Examiner* — Sudesh M Patidar
(74) *Attorney, Agent, or Firm* — McDonnell Boehnen Hulbert & Berghoff LLP

(57) ABSTRACT

A method and system to control anchor carrier configuration for dual-connectivity service of a user equipment device (UE), the dual-connectivity service including the UE being served concurrently by a master node (MN) over a first connection and by a secondary node (SN) over a second connection. An example method includes determining, when the UE has the first connection with the MN, that the UE is within threshold poor coverage of the MN. And the method includes selecting as the anchor carrier one of multiple carriers on which the MN provides service. Further, the method includes, based at least on determining that the UE is within the threshold poor coverage of the MN, basing the carrier selection on a transmission mode that the MN supports using on the selected carrier. And the method includes causing the selected carrier to be the anchor carrier for the dual-connectivity service of the UE.

18 Claims, 3 Drawing Sheets

(56) References Cited

U.S. PATENT DOCUMENTS

| | | | |
|---|---|---|---|
| 2011/0243100 A1* | 10/2011 | Ball | H04B 7/0689 370/335 |
| 2012/0269148 A1* | 10/2012 | Hultell | H04W 72/0406 370/329 |
| 2014/0119223 A1* | 5/2014 | Song | H04W 72/085 370/252 |
| 2014/0301372 A1* | 10/2014 | Fukuta | H04W 36/20 370/332 |
| 2015/0295694 A1* | 10/2015 | Li | H04B 7/0452 370/329 |
| 2016/0066301 A1* | 3/2016 | Zhu | H04W 28/18 370/329 |
| 2016/0227519 A1* | 8/2016 | Nimbalker | H04W 72/042 |
| 2018/0249475 A1 | 8/2018 | Kronestedt et al. | |
| 2018/0255493 A1 | 9/2018 | Wu | |
| 2019/0037417 A1 | 1/2019 | Lei et al. | |
| 2019/0312696 A1* | 10/2019 | Kim | H04L 5/0048 |
| 2019/0313314 A1* | 10/2019 | Yang | H04W 24/10 |
| 2020/0305161 A1* | 9/2020 | Luo | H04B 10/2575 |
| 2021/0044993 A1* | 2/2021 | Jha | H04W 36/0083 |
| 2021/0160704 A1* | 5/2021 | Aksu | H04W 4/021 |

\* cited by examiner

DUAL-CONNECTIVITY ANCHOR-CARRIER SELECTION BASED ON TRANSMISSION-MODE SUPPORT

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, other resource elements could be reserved to carry periodically broadcast system information messages such as a master information block (MIB) for example, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller and access node could then coordinate setup for the UE of one or more bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE. For example, with the example air interface described above, when packet data for the UE arrives at the core network from a transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

In some implementations, if an access node supports service on multiple carriers, the access node might also configure carrier-aggregation service for the UE, by adding one or more secondary carriers to the UE's connection with the access node. With carrier aggregation, one of the carriers, typically the one on which the UE initially connected with the access node, is deemed the UE's primary component carrier (PCC) and may be used for key signaling related to the UE's service, whereas each other carrier in the UE's connection is deemed a secondary component carrier (SCC) of the UE's service, functioning mainly to provide the UE with increased aggregate bandwidth and higher associated peak-data rate for instance.

When the industry advances from one generation of wireless technology to the next, or in other scenarios, networks and UEs may also support dual-connectivity service, where a UE is served on co-existing connections, perhaps according to multiple different RATs.

For instance, a first access node could be configured to provide service according to a first RAT and a second access node could be configured to provide service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" connectivity) could help facilitate increased peak data-rate of communications, by multiplexing the UE's communications across the multiple air-interface connections. Further or alternatively, dual connectivity may provide other benefits compared with serving a UE on a single connection (as "standalone" connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

When a UE that supports dual-connectivity service enters into coverage of such a system, the UE could initially scan for and detect coverage of a first-RAT access node on a first-RAT carrier and engage in signaling to establish a first-RAT connection between the UE and that access node on that carrier as discussed above. Further, that access node may also add one or more additional carriers to the UE's first-RAT connection to provide the UE with carrier-aggregation service as noted above.

In addition, perhaps having determined from profile data that the UE is dual-connectivity-capable, the UE's serving access node, acting as an MN, could engage in a process to configure dual connectivity for the UE. For instance, the MN could first identify a second-RAT access node to serve as an SN for the UE, perhaps based on measurement reporting from the UE or based on certain coverage assumptions. And the MN could then engage in signaling with the core-network controller, with the SN, and with the UE, to establish a second-RAT connection between the UE and the SN on a second-RAT carrier and to configure bearer connectivity for the UE via the secondary access node. Further, the UE's second-RAT connection with the SN could likewise be configured to encompass multiple carriers, including a PCC and one or more SCCs.

With these first-RAT and second-RAT connections so established for the UE, the MN and SN could then serve the UE with packet-data communications on their respective connections with the UE, each in the manner discussed above, for instance with a portion of data flowing over the UE's first-RAT connection between the UE and the MN concurrently with another portion of the data flowing over the UE's second-RAT connection between the UE and the SN.

In this dual-connectivity arrangement, the carrier on which the UE is connected with the MN (e.g., the sole such carrier or, with carrier-aggregation service, the UE's PCC) could function as an anchor carrier for the UE's dual-connectivity service. The anchor carrier could be especially important for the UE's dual-connectivity service, for various reasons. For instance, RRC signaling related to the UE's dual-connectivity service (e.g., directives related to configuration and management of the dual-connectivity service, measurement reporting related messages, etc.) may occur on that carrier in particular. Whereas, any other carrier on which the UE is connected with the MN, as well as each of one or more carriers on which the UE is concurrently connected with the SN, may function merely to help provide the UE with increased peak data rate and/or other advantages.

Given the importance of the UE's anchor carrier for the UE's dual-connectivity service, it may be desirable to help ensure that air-interface communication between the MN and the UE on that carrier in particular is as robust as possible.

Unfortunately, however, one technical problem that can arise in practice is that the UE may be in relatively poor coverage of the MN. In particular, the UE may be relatively distant from the MN, at or near the MN's cell edge. And in that situation, air-interface communication between the MN and the UE may be weak.

Recognizing this issue, the present disclosure provides a technical mechanism to help optimize anchor carrier communication between the MN and the UE for dual-connectivity service. The mechanism can apply in a situation where the MN operates on multiple carriers and when the UE is primarily connected with the MN on a given one of those carriers—e.g., as the sole carrier on which the UE is connected with the MN or as the UE's PCC if served by the MN with carrier aggregation service.

In that situation, the MN could detect that the UE is in threshold poor coverage of the MN. And in response to detecting that the UE is in threshold poor coverage of the MN, the MN could take action to help optimize the MN's anchor carrier communication with the UE given the UE's poor coverage. In particular, to help optimize the MN's anchor carrier communication with the UE in poor coverage, the MN could select one of the MN's multiple carriers to be the UE's anchor carrier, specifically basing the selection of that carrier on at least a consideration of a transmission mode that the MN supports on the carrier.

In practice, for instance, the MN may support different transmission modes on the MN's various carriers, due to differences in antenna structure per carrier and/or differences in other hardware or software per carrier. In response to detecting that the UE is within poor coverage of the MN, the MN could then work to select as the UE's anchor carrier one of the MN's carriers on which the MN supports a transmission mode that would be optimal for communicating with a UE in poor coverage of the MN. Examples of this could include selecting a carrier based on the MN supporting transmit diversity on the carrier and/or selecting a carrier based on the MN supporting beamforming on the carrier, among other possibilities.

Upon selecting that carrier, the MN could then cause the carrier to be the UE's carrier for dual-connectivity service. For instance, if the UE is currently connected with the MN primarily on the selected carrier (e.g., as sole carrier of the UE's connection with the MN, or as the UE's PCC of its connection with the MN), then the MN could retain that connection so that that carrier would be the UE's anchor carrier for dual-connectivity service. Or if the UE is currently connected with the MN primarily on another carrier, the MN could reconfigure the UE's connection with the MN to have the UE be connected with the MN primarily on the selected carrier, so that the selected carrier would be the UE's anchor carrier for dual-connectivity service.

These operations could also occur with various timing in relation to configuration of dual-connectivity service for the UE. For instance, the operations could occur before the MN establishes dual connectivity for the UE, but perhaps once the MN has decided to establish dual-connectivity for the UE (e.g., just after the UE has initially connected with the MN). Or the operations could occur after the MN has already established dual connectivity for the UE, while the UE is thus already dual connected.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

Figure 1:
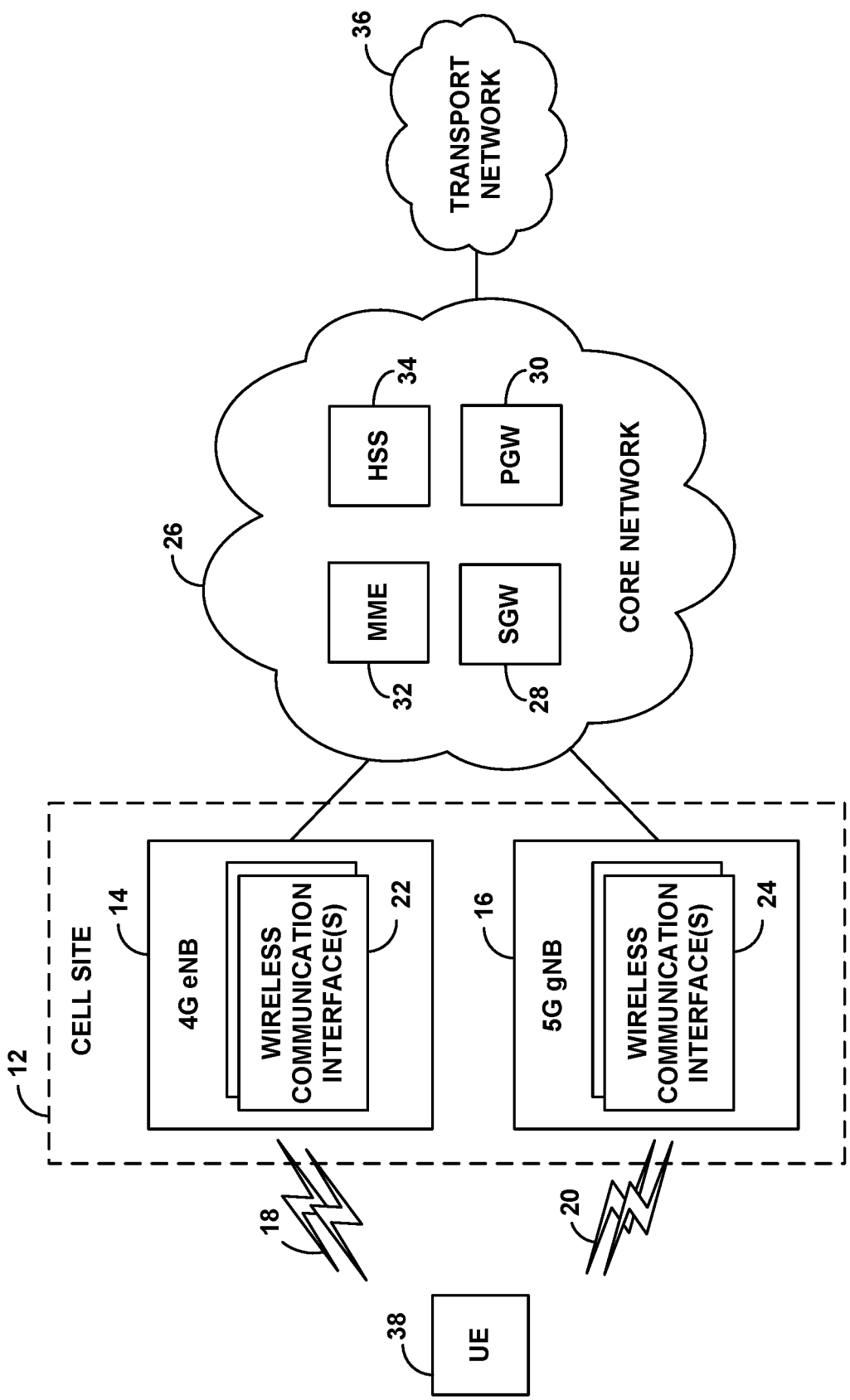
FIG. 1 is a simplified block diagram of an example network arrangement in which features of the present disclosure can be implemented.

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, relays, femtocell access nodes, or the like, possibly configured to provide a smaller range of coverage. And while shown as being at a common cell site, the access nodes could alternatively be separately located.

In the example arrangement shown, the 4G eNB 14 is configured to provide service and coverage on multiple carriers 18, and the 5G gNB 16 is configured to provide service and coverage on multiple carriers 20. Each of these carriers could be defined in a given frequency band and could have a given duplex mode (e.g., FDD or TDD).

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

To facilitate providing coverage and service on these carriers, each access node could include one or more wireless communication interfaces. For instance, the 4G eNB 14 could include wireless communication interfaces 22 that the 4G eNB 14 could use to provide coverage and service on its carriers 18, and the 5G gNB 16 could include wireless communication interfaces 24 that the 5G gNB 16 could use to provide coverage and service on its carriers 20. Each such wireless communication interface could include an antenna structure, such as an antenna array or portion of an antenna array and other associated RF hardware and/or software, possibly sharing some such components with one or more other wireless communication interfaces.

Further, on each of one or more carriers on which an access node provides coverage and service, the access node may support different respective capabilities as to the access node's air-interface communication. These differences in air-interface communication capabilities be a result of differences in the wireless communication interfaces that the access node uses for one carrier versus another, such as differences in quantity or type of antennas and differences in other RF hardware and/or software related to the access node's service.

One such difference of the access node's capabilities from carrier to carrier could be the access node's transmission-mode support per carrier. An access node's "transmission mode" or "TM" defines a form of transmission from the access node, such as the manner in which the access node would provide downlink scheduled transmission to a served UE. Examples of transmission modes (which could be implementation specific) may include (i) TM3, transmit diversity for UEs in certain RF conditions, (ii) TM4, spatial multiplexing, and (iii) TM8, dual-layer beamforming.

For example, on one of the access node's carriers, the access node may support use of TM3 but not TM4, whereas on another of the access node's carriers, the access node may support use of TM4 but not TM3. As another example, on one of the access node's carriers, the access node may support use of TM8 but not TM3, whereas on another of the access node's carriers, the access node may support use of TM3 but not TM8. And as yet another example, on one of the access node's carriers, the access node may support use of TM8 and TM3, whereas on another of the access node's carriers, the access node may support TM3 but not TM8.

Continuing with reference to FIG. 1, as shown, the 4G eNB 14 and 5G gNB 16 could both be interfaced with a core network 26, such as an Evolved Packet Core (EPC) network or Next Generation Core (NGC) network. In the example shown, the core network 22 includes a serving gateway (SGW) 28, a packet data network gateway (PGW) 30, a mobility management entity (MME) 32, and a home subscriber server (HSS) 34, although other arrangements are possible as well.

In an example implementation, without limitation, each access node could have an interface with the SGW 28, the SGW 28 could have an interface with the PGW 30, and the PGW 30 could provide connectivity with a transport network 36. Further, each access node could have an interface with the MME 32, and the MME 32 could have an interface with the SGW 28, so that the MME 32 could coordinate setup of bearers for UEs to enable the UEs to engage in packet-data communication via 4G and 5G. Alternatively, just the 4G eNB 14 might have an interface with the MME 32 and may function as an anchor for signaling with the MME 32 both for 4G service and for 5G and EN-DC service. Still further, the HSS 34 could store UE profile records, which could specify service-subscription plans, UE configurations, and/or other such UE capability information, such as whether a UE is EN-DC capable for instance.

FIG. 1 also illustrates an example UE 38 that could be within coverage of the 4G eNB 14 and the 5G gNB 16. This UE could take any of the forms noted above, among other possibilities, and could be equipped with a 4G LTE radio and a 5G NR radio as well as associated circuitry and logic that enables the UE to engage in 4G LTE service, 5G NR service, and EN-DC service. Further, the 4G eNB 14 and 5G gNB 16 could be configured to support providing EN-DC service.

When the UE initially enters into coverage of the example cell site 12, the UE could scan for and detect coverage of the 4G eNB 14 on one of the 4G eNB's carriers 18, and the UE could determine coverage strength from the 4G eNB 14 on that carrier, such as by measuring a reference signal receive strength (RSRP). If the UE determines that that coverage is sufficiently strong, the UE could then engage in random access signaling and RRC configuration signaling with the 4G eNB 14 as discussed above to connect with the 4G eNB 14 on the carrier, thus putting the UE in an RRC-connected mode on that carrier. Further, the 4G eNB 14 could establish in data storage a context record for the UE and could store in the context record an identification of the UE's established RRC connection and an identification of the 4G carrier on which the UE is connected with the 4G eNB 14.

Once the UE is connected with the 4G eNB 14, the UE could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE of at least one user-plane bearer. For instance, the MME 32 could engage in signaling with the 4G eNB 14 and the SGW 28 to coordinate setup for the UE of an S1-U packet tunnel between the access node and the SGW 28, and the SGW 28 could responsively engage in signaling with the PGW 30 to coordinate setup for the UE of an associated S5 packet tunnel between the SGW 28 and the PGW 30. Further, the 4G eNB 14 could engage in signaling with the UE to establish for the UE an associated data radio bearer (DRB).

As further noted above, the 4G eNB 14 might also configure carrier-aggregation service for the UE by adding one or more carriers to the UE's RRC connection. For instance, the 4G eNB 14 could send an RRC connection reconfiguration message to the UE to inform the UE of the added carrier(s) and could update the UE's context record accordingly. Further, the 4G eNB 14 could designate one of the carriers, perhaps the one on which the UE initially connected with the 4G eNB 14, as being the UE's PCC, and could designate each other carrier as being an SCC of the UE.

When the UE is connected with and served by the 4G eNB 14, a given carrier of the UE's connection would be considered the primary carrier on which the UE is connected with the 4G eNB 14, which function as an anchor for key control signaling, such as RRC signaling, between the 4G eNB 14 and the UE. If the UE's connection with the 4G eNB 14 encompasses just a single carrier, that carrier could be considered the primary carrier on which the UE is connected with the 4G eNB 14. Whereas, if the UE's connection with the 4G eNB 14 encompasses multiple carriers, the UE's PCC could be considered the primary carrier on which the UE is connected with the 4G eNB.

In any event, once the UE is connected with the 4G eNB 14 and registered with core network, the 4G eNB 14 could then serve the UE with wireless packet-data communications as noted above. For instance, when the 4G eNB 14 receives data for delivery to the UE, the 4G eNB could coordinate transmission of that data on downlink PRBs of the carrier(s) on which the UE is connected with the 4G eNB 14. And when the UE has data for delivery to the 4G eNB 14, the UE could transmit a scheduling request to the 4G eNB 14, and the 4G eNB 14 could coordinate transmission of that data on uplink PRBs of the carrier(s) on which the UE is connected with the 4G eNB 14.

In addition, in relation to the UE's attachment process or at another time, the 4G eNB 14 could receive from the MME 32 or from the UE a UE capability report indicating that the UE is EN-DC capable. And the 4G eNB 14 could work to configure EN-DC service for the UE.

For instance, the 4G eNB 14, operating as MN, could first engage in process to add the 5G gNB 16 as an SN for the UE, such as by transmitting to the 5G gNB 16 an SN-Addition request to cause the 5G gNB to allocate resources for a 5G connection for the UE on one or more 5G carriers, receiving an SN-Addition-Request acknowledge message from the 5G gNB 16, and engaging in associated RRC signaling with the UE, in response to which the UE could then access and complete establishment of the 5G connection. Further, the 4G eNB 14 could engage in signaling to establish bearer connectivity for the UE via the 5G gNB 16 could engage in signaling to transfer the UE's access bearer (e.g., the UE's S1-U tunnel) to the 5G gNB 16 and to set up a split bearer.

The 4G eNB 14 and 5G gNB 16 could then provide the UE with EN-DC service, concurrently serving the UE over their respective connections with the UE as discussed above. Namely, as each access node receives data that it will transmit over its respective air interface to the UE, the access node could buffer that data, allocate downlink PRBs of the access node's respective air interface, and transmit the buffered data to the UE in the allocated downlink PRBs. And as the UE has data for transmission respectively to each UE, the UE could buffer the data and send to the access node a scheduling request, the access node could allocate uplink PRBs of the access node's respective air-interface if and when available, and the UE could transmit the buffered data to the access node in the allocated uplink PRBs.

With EN-DC so established for the UE, the carrier on which the UE is primarily connected with the 4G eNB 14 could function as the anchor carrier for the UE's EN-DC service. For instance, that carrier in particular could be the anchor for carrying key control signaling, such as RRC signaling, related to the UE's EN-DC service. Therefore, the quality of air-interface communication between the 4G eNB 14 and the UE on that carrier in particular could be important.

As noted above, the presently disclosed mechanism can help to optimize anchor carrier communication between the 4G eNB 14 and the UE for EN-DC service, in a scenario where the UE is in threshold poor coverage of the 4G eNB 14, such as where the UE is threshold distant from the 4G eNB 14. In particular, the disclosure provides that, when the UE is in threshold poor coverage of the 4G eNB 14, the 4G eNB 14 could arrange to have the UE's anchor carrier for EN-DC service be a carrier on which the 4G eNB 14 supports a transmission mode that would help to optimize air-interface communication between the 4G eNB 14 and the UE.

In practice, for example, the 4G eNB 14 could first determine that the UE is within threshold poor coverage of the 4G eNB 14.

For instance, the 4G eNB 14 could make this determination based on most recent measurement reporting from the UE, perhaps based on the UE having reported to the 4G eNB 14 that the UE's RSRP from the 4G eNB 14 is at a level that is at least as low as a threshold predefined for present purposes. This threshold could be a level higher than the level that may trigger handover processing. So the UE's RSRP meeting this threshold could represent a scenario where the UE is in poor coverage of the 4G eNB 14 but not in such poor coverage that the 4G eNB 14 would hand over the UE to another 4G eNB 14.

Alternatively, the 4G eNB 14 could determine that the UE is within threshold poor coverage of the 4G eNB 14 in another manner, such as based on location data indicating that the UE is threshold distant from the 4G eNB 14, among other possibilities.

In response to at least the determination that the UE is within threshold poor coverage of the 4G eNB 14, the 4G eNB 14 could then use the 4G eNB's per-carrier transmission-mode support as a basis to select one of the 4G eNB's carriers to be the UE's anchor carrier for EN-DC service. To facilitate this, the 4G eNB 14 could refer to data that specifies the transmission mode(s) that the 4G eNB supports respectively per carrier on which the 4G eNB 14 provides service. Without limitation, this data could be included in the MIBs that the 4G eNB 14 broadcasts on its various carriers, so the 4G eNB 14 could refer to those MIBs to access the data. Alternatively, the 4G eNB 14 may otherwise be provisioned with or have access to the data.

To help optimize anchor carrier communication between the 4G eNB 14 and the UE, the 4G eNB 14 could then use that transmission-mode-support data as a basis to select a carrier on which the 4G eNB 14 supports use of a transmission mode that could help facilitate robust air-interface communication.

Here, for instance, the 4G eNB 14 could select a carrier based on the 4G eNB 14 supporting use of a particular transmission mode on the carrier, such as based on the 4G eNB 14 supporting use of TM8 on the carrier. Further, the 4G eNB 14 could forgo selecting a carrier based on the 4G eNB 14 not supporting use of such a given transmission mode on the carrier. And still further, this anchor carrier selection could involve the 4G eNB 14 conducting a comparison between the 4G eNB's transmission-support respectively on two or more carriers on which the 4G eNB 14 provides service, selecting the carrier on which the 4G eNB 14 supports use of a more or most robust transmission mode, among other possibilities.

By way of example, the 4G eNB 14 may have Carrier 1 with TM3 support (i.e., on which the 4G eNB 14 supports use of TM3) but not TM4 support, and the 4G eNB 14 may have Carrier 2 with TM4 support but not TM3 support. And in that scenario, for the UE that the 4G eNB 14 has determined to be in threshold poor coverage, the 4G eNB 14 could select Carrier 1 to be the UE's anchor carrier for EN-DC service, because TM3 transmit diversity may help to provide more robust air-interface communication with a cell-edge UE than TM4 spatial multiplexing would.

As another example, the 4G eNB 14 may have Carrier 1 with TM8 support but not TM3 support, and the 4G eNB 14 may have Carrier 2 with TM3 support but not TM8 support. And in that scenario, for the UE that the 4G eNB 14 has determined to be in threshold poor coverage, the 4G eNB 14 could select Carrier 1 to be the UE's anchor carrier for EN-DC service, because TM8 beamforming may help to provide more robust air-interface communication with a cell-edge UE (e.g., due to likely higher gain and signal quality) than TM3 transmit diversity would.

And as still another example, the 4G eNB 14 may have Carrier 1 with both TM8 support and TM3 support, and the 4G eNB may have Carrier 2 with TM3 support but not TM8 support. And in that case, for the UE that the 4G eNB 14 has determined to be in threshold poor coverage, the 4G eNB 14 could select Carrier 1 to be the UE's anchor carrier for EN-DC service, likewise because TM8 beamforming may help provide more robust air-interface communication with a cell-edge UE than TM3 would.

Numerous other examples could be possible as well.

Once the 4G eNB 14 so selects the carrier to be the UE's anchor for EN-DC service, the 4G eNB 14 could then cause the selected carrier to be the UE's anchor carrier for EN-DC service.

Here, for instance, if the carrier on which the UE is primarily connected with the 4G eNB 14 is already the selected carrier, then causing the selected carrier to be the UE's anchor carrier for EN-DC service could involve maintaining the state of the UE being primarily connected with the 4G eNB 14 on that carrier.

Whereas, if the carrier on which the UE is primarily connected with the 4G eNB 14 is not the selected carrier, then causing the selected carrier to be the UE's anchor carrier for EN-DC service could involve reconfiguring the UE's RRC connection with the 4G eNB 14 to make the selected carrier the carrier on which the UE is primarily connected with the 4G eNB 14. For instance, if the selected carrier is currently an SCC in the UE's connection, the 4G eNB 14 could reconfigure the UE's connection to make that carrier instead the UE's SCC, such as by sending the UE an RRC connection-reconfiguration message specifying the reconfiguration and updating the UE's context record accordingly. Or if the selected carrier is not currently in the UE's connection, the 4G eNB 14 could likewise reconfigure the UE's connection to add the selected carrier to the UE's connection as the primary carrier on which the UE is connected with the 4G eNB 14.

As further noted above, these operations could occur with various timing in relation to configuration of EN-DC service for the UE. For instance, the operations could occur before the 4G eNB 14 establishes EN-DC service for the UE, but perhaps once the 4G eNB 14 has decided to establish EN-DC service for the UE (e.g., just after the UE has initially connected with the 4G eNB, or perhaps when a trigger conduction such as threshold high data flow occurs that may cause the 4G eNB 14 to set up EN-DC service for the UE). Or the operations could occur after the 4G eNB has already established EN-DC for the UE, while the UE is thus already EN-DC connected.

Figure 2:
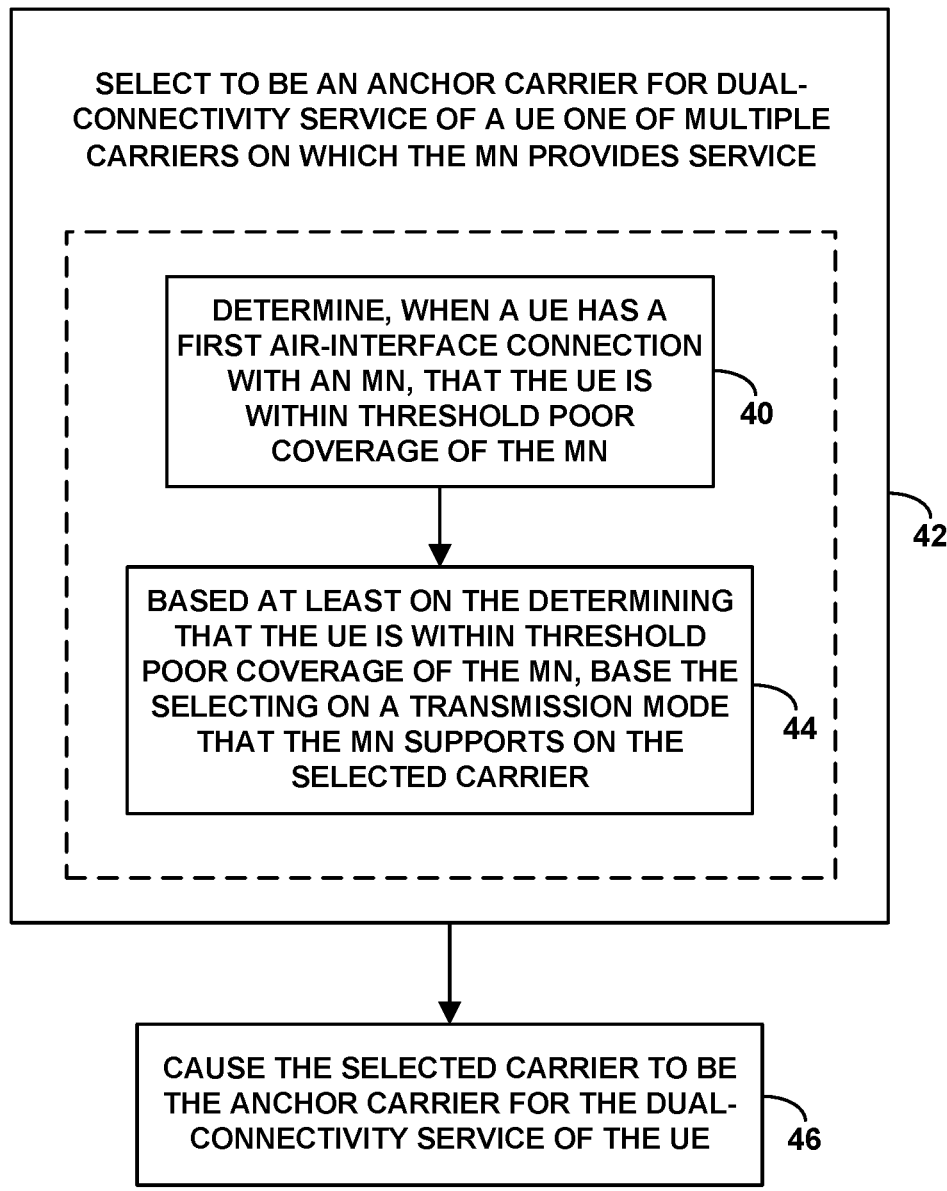
FIG. 2 is a flow chart depicting an example method in accordance with the disclosure.

FIG. 2 is next a flow chart depicting a method that could be carried out in accordance with the present disclosure, to control anchor carrier configuration for dual-connectivity service of a UE, where the dual-connectivity service includes the UE being served concurrently by a master access node (MN) over a first air-interface connection and by a secondary access node (SN) over a second air-interface connection, and where the MN provides service on multiple carriers. In an example implementation, this method could be carried out by or for the MN.

As shown in FIG. 2, at block 40, the method includes determining, when the UE has the first air-interface connection with the MN, that the UE is within threshold poor coverage of the MN. And at block 42, the method includes selecting one of the multiple carriers to be the anchor carrier for the dual-connectivity service of the UE. Further, at block 44, the method includes, based at least on the determining that the UE is within threshold poor coverage of the MN, basing the selecting on a transmission mode that the MN supports on the selected carrier. And at block 46, the method includes causing the selected carrier to be the anchor carrier for the dual-connectivity service of the UE.

In line with the discussion above, the MN could carry out this method in preparation for establishing the dual-connectivity service for the UE (e.g., when the MN is going to establish that service for the UE) or after the dual-connectivity service is established for the UE.

Further, as discussed above, the act of determining that the UE is within threshold poor coverage of the MN could be based one or more factors such as (i) RSRP that the UE reports receiving from the MN and/or (ii) location data indicating that the UE is threshold distant from the MN.

Still further, as discussed above, the act of basing the carrier section on the transmission mode that the MN supports using on the selected carrier could involve basing the carrier selection on a determination that the MN support use of a particular transmission mode on the selected carrier—and perhaps basing the carrier selection on a comparison of transmission-mode support of the MN on the selected carrier with transmission-mode support of the MN on another carrier of the multiple carriers. In practice, as noted above, the transmission mode could be a mode such as (i) transmit diversity, (ii) spatial multiplexing, or (iii) beamforming. Further, the basis could alternatively be that the MN supports two or more particular transmission modes on the carrier, among other possibilities.

As additionally discussed above, the method could apply in a situation where the first air-interface connection over which the MN serves the UE has the UE primarily connected with the MN on the selected carrier, in which case the act of causing the selected carrier to be the anchor carrier for the dual-connectivity service of the UE could involve maintaining configuration of the UE being primarily connected with the MN on the selected carrier (e.g., forgoing changing the carrier). Alternatively, the method could apply in a situation where the first air-interface connection over which the MN serves the UE does not have the UE primarily connected with the MN on the selected carrier, in which case the act of causing the selected carrier to be the anchor carrier for the dual-connectivity service of the UE could involve reconfiguring the first air-interface connection to have the UE be primarily connected with the MN on the selected carrier.

Yet further, as discussed above, this method could be carried out by way of example in a scenario where the first air-interface connection is a 4G LTE connection, the second air-interface connection is a 5G NR connection, and the dual-connectivity service is EN-DC service. And the anchor carrier for the dual-connectivity service could be an anchor for RRC signaling with the UE.

Note also that similar a similar method could be carried out specifically for purposes of selecting a carrier to be an anchor carrier for dual-connectivity service of a UE, without including the added operation of then causing the UE to operate on the selected carrier. An MN could then follow operation of that method with causing the UE to operate on the selected carrier as noted above.

Figure 3:
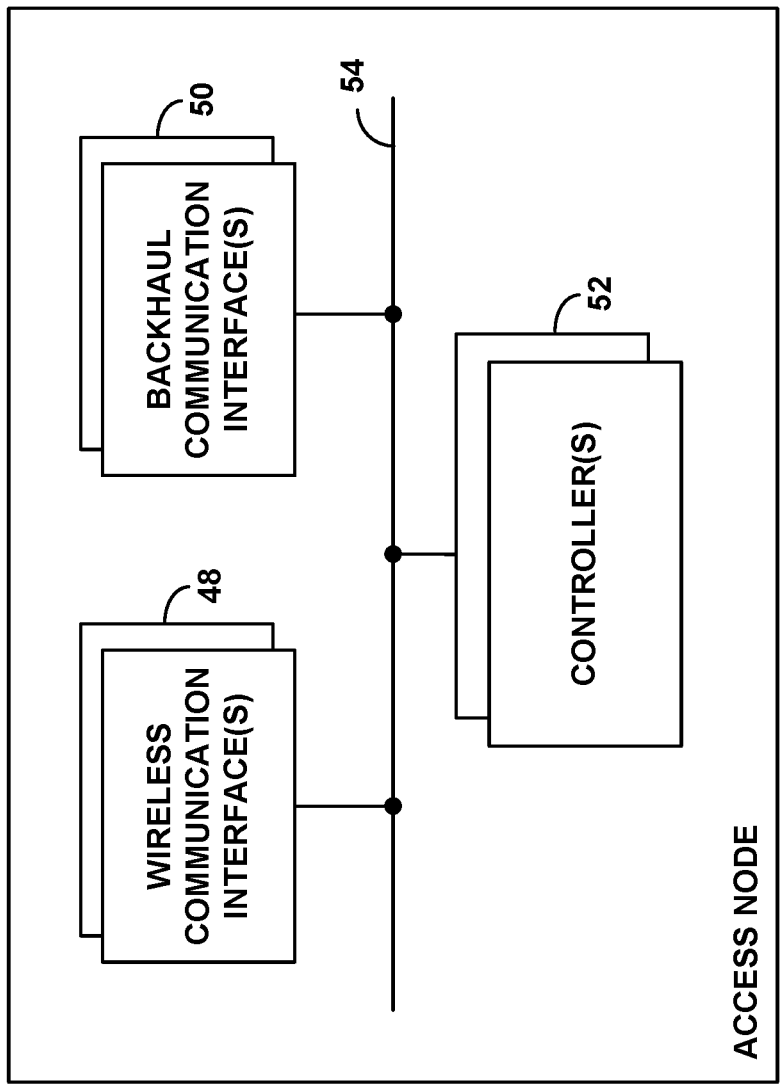
FIG. 3 is a simplified block diagram of an example access node operable in accordance with the disclosure.

Finally, FIG. 3 is a simplified block diagram of an example first access node that could implement various features described herein, to control anchor carrier configuration for dual-connectivity service of a UE, where the dual-connectivity service includes the UE being served concurrently by a the first access node over a first air-interface connection and by a second access node over a second air-interface connection, the first access node providing service on multiple carriers.

As shown in FIG. 3, the example first access node includes at least one wireless communication interface 48, at least one backhaul communication interface 50, and at least one controller 52, all of which could be integrated together and/or communicatively linked together by a system bus, network, or other connection mechanism 54.

In an example implementation, each wireless communication interface 48 could comprise an antenna structure, which could be tower mounted or could take other forms, and associated components such as a power amplifier and a wireless transceiver, so as to facilitate providing coverage and service on one or more carriers. And each backhaul communication interface 50 could comprise a network communication interface such as an Ethernet interface, through which the first access node could engages in backhaul communication on a core network for instance.

Further, each controller 52 could comprise one or more processing units (e.g., one or more general purpose processors (e.g., microprocessors) and/or specialized processors) programmed to cause the first access node to carry out various operations such as those discussed above. For instance, a representative controller 52 could comprise one or more non-transitory data storage units (e.g., one or more magnetic, optical, or flash storage components) which could store program instructions executable by the one or more processing units to cause the first access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control anchor carrier configuration for dual-connectivity service of a user equipment device (UE), wherein the dual-connectivity service includes the UE being served concurrently by a master access node (MN) over a first air-interface connection and by a secondary access node (SN) over a second air-interface connection, and wherein the MN operates on a radio access technology and provides service on multiple carriers, the method comprising:
    determining, when the UE has the first air-interface connection with the MN, that the UE is within threshold poor coverage of the MN;
    selecting one of the multiple carriers to be the anchor carrier for the dual-connectivity service of the UE;
    based at least on the determining that the UE is within the threshold poor coverage of the MN, basing the selecting on a transmission mode that the MN supports using on the selected carrier and that is selected from the group consisting of (i) transmit diversity, (ii) spatial multiplexing, and (iii) beamforming, wherein the transmission mode defines a manner in which the MN would provide downlink scheduled transmission on the selected carrier; and
    causing the selected carrier to be the anchor carrier for the dual-connectivity service of the UE.

2. The method of claim 1, wherein the method is carried out by the MN.

3. The method of claim 2, wherein the method is carried out by the MN in preparation for establishing the dual-connectivity for the UE.

4. The method of claim 2, wherein the method is carried out by the MN after the dual-connectivity is established for the UE.

5. The method of claim 2, wherein determining that the UE is within threshold poor coverage of the MN is based on at least one factor selected from the group consisting of (i) reference signal receive power that the UE reports receiving from the MN and (ii) location data indicating that the UE is threshold distant from the MN.

6. The method of claim 2, wherein basing the selecting on the transmission mode that the MN supports using on the selected carrier comprises basing the selecting on a determination that the MN support use of a particular transmission mode on the selected carrier.

7. The method of claim 2, wherein basing the selecting on the transmission mode that the MN supports using on the selected carrier comprises basing the selecting on a comparison of transmission-mode support of the MN on the selected carrier with transmission-mode support of the MN on another carrier of the multiple carriers.

8. The method of claim 2, wherein the first air-interface connection over which the MN serves the UE has the UE primarily connected with the MN on the selected carrier, and wherein causing the selected carrier to be the anchor carrier for the dual-connectivity service of the UE comprises maintaining configuration of the UE being primarily connected with the MN on the selected carrier.

9. The method of claim 2, wherein the first air-interface connection over which the MN serves the UE does not have the UE primarily connected with the MN on the selected carrier, and wherein causing the selected carrier to be the anchor carrier for the dual-connectivity service of the UE comprises reconfiguring the first air-interface connection to have the UE be primarily connected with the MN on the selected carrier.

10. The method of claim 1, wherein the first air-interface connection is a 4G Long Term Evolution (LTE) connection, the second air-interface connection is a 5G New Radio (5G NR) connection, and the dual-connectivity service is EUTRA-NR Dual Connectivity (EN-DC) service.

11. The method of claim 1, wherein the anchor carrier for the dual-connectivity service of the UE is an anchor for Radio Resource Control (RRC) signaling with the UE.

12. A method to select an anchor carrier for dual-connectivity service of a user equipment device (UE), wherein the dual-connectivity service includes the UE being served concurrently by a master access node (MN) over a first air-interface connection and by a secondary access node (SN) over a second air-interface connection, and wherein the MN operates on a radio access technology and provides service on multiple carriers, the method comprising:
    determining, when the UE has the first air-interface connection with the MN, that the UE is within threshold poor coverage of the MN;
    selecting one of the multiple carriers to be the anchor carrier for the dual-connectivity service of the UE; and
    based at least on the determining that the UE is within the threshold poor coverage of the MN, basing the selecting on a transmission mode that the MN supports using on the selected carrier and that is selected from the group consisting of (i) transmit diversity, (ii) spatial multiplexing, and (iii) beamforming, wherein the transmission mode defines a manner in which the MN would provide downlink scheduled transmission on the selected carrier.

13. A first access node operable to control anchor carrier configuration for dual-connectivity service of a user equipment device (UE), wherein the dual-connectivity service includes the UE being served concurrently by the first access node over a first air-interface connection and by a second access node over a second air-interface connection, wherein the first access node operates on a radio access technology and provides service on multiple carriers, the first access node comprising:
    at least one wireless communication interface including an antenna structure through which to provide coverage and service;
    a backhaul communication interface through which to engage in backhaul communication; and
    a controller, wherein the controller causes the first access node to carry out operations including:
        determining, when the UE has the first air-interface connection with the first access node, that the UE is within threshold poor coverage of the first access node,
        selecting one of the multiple carriers to be the anchor carrier for the dual-connectivity service of the UE,
        based at least on the determining that the UE is within the threshold poor coverage of the first access node, basing the selecting on a transmission mode that the first access node supports using on the selected carrier and that is selected from the group consisting of (i) transmit diversity, (ii) spatial multiplexing, and (iii) beamforming, wherein the transmission mode defines a manner in which the first access node would provide downlink scheduled transmission on the selected carrier, and causing the selected carrier to be the anchor carrier for the dual-connectivity service of the UE.

14. The first access node of claim 13, wherein the controller comprises a processing unit, non-transitory data storage, and program instructions stored in the non-transitory data storage and executable by the processing unit to carry out the operations.

15. The first access node of claim 13, wherein basing the selecting on the transmission mode that the first access node supports using on the selected carrier comprises basing the selecting on a determination that the first access node support use of a particular transmission mode on the selected carrier.

16. The first access node of claim 15, wherein basing the selecting on the transmission mode that the first access node supports using on the selected carrier comprises basing the selecting on a comparison of transmission-mode support of the first access node on the selected carrier with transmission-mode support of the first access node on another carrier of the multiple carriers.

17. The first access node of claim 13, wherein the first air-interface connection is a 4G Long Term Evolution (LTE) connection, the second air-interface connection is a 5G New Radio (5G NR) connection, and the dual-connectivity service is EUTRA-NR Dual Connectivity (EN-DC).

18. The first access node of claim 13, wherein the anchor carrier for the dual-connectivity service of the UE is an anchor for Radio Resource Control (RRC) signaling with the UE.

* * * * *